April 22, 1969 S. YANDO 3,439,416

METHOD AND APPARATUS FOR FABRICATING AN ARRAY OF DISCRETE ELEMENTS

Filed Feb. 3, 1966 Sheet 1 of 3

INVENTOR.
STEPHEN YANDO

BY R. J. Frank
ATTORNEY.

INVENTOR.
STEPHEN YANDO

BY R. J. Frank
ATTORNEY.

INVENTOR.
STEPHEN YANDO
BY R. J. Frank
ATTORNEY.

United States Patent Office 3,439,416
Patented Apr. 22, 1969

3,439,416

METHOD AND APPARATUS FOR FABRICATING AN ARRAY OF DISCRETE ELEMENTS

Stephen Yando, Huntington, N.Y., assignor to General Telephone and Electronics Laboratories, Inc., a corporation of Delaware Filed Feb. 3, 1966, Ser. No. 524,718
Int. Cl. H05k *3/00;* B41m *3/08*
U.S. Cl. 29—625 10 Claims

ABSTRACT OF THE DISCLOSURE

A method of fabricating a planar array of magnetically coated discrete elements. In accordance with the method, the elements are placed on the surface of a matrix containing a plurality of pairs of spaced oppositely poled magnets disposed in a non-magnetic base. The matrix is vibrated causing the elements to move to desired positions on the surface thereof. An electrically non-conductive bonding agent is placed between the oriented elements, and an electrically conductive layer is deposited on the exposed surfaces of the elements and bonding agent. The array is completed by removel of the matrix.

This invention relates to the fabrication of an array of discrete elements and more particularly to a method and apparatus for fabricating a planar array of discrete elements.

The present interest in compact electrical circuits has resulted in a substantial reduction in size in many types of electrical circuits, notably those circuits generally referred to as microminiature circuits. In addition, considerable time and effort have been expended on devising methods of making components of a size suitable for use in microminiature circuits. While these methods have resulted in considerable reduction of component size to a point where the dimensions of circuit elements are expressed in thousandths of an inch, the individual handling, location and orientation of a large number of these circuit elements is difficult.

Accordingly, an object of this invention is to provide an improved method of fabricating an array of discrete elements.

Another object is to provide a method for precisely locating a multiplicity of discrete elements in an array.

A further object is to provide a method for locating and orienting a multiplicity of discrete elements in an array.

Still another object is to provide improved apparatus for fabricating an array of discrete elements.

Briefly stated, this invention is a method of fabricating a planar array of discrete elements in which the individual elements are precisely located and oriented in a predetermined manner.

The method employs a matrix containing a plurality of pairs of spaced oppositely poled magnets. Each pair of magnets produces an external magnetic field proximate to a surface of the matrix. The individual elements are provided with a magnetic coating on at least one surface. The elements are then placed on the surface of the matrix without regard to their desired location and orientation. When the matrix is vibrated, motion is imparted to the elements and the elements move freely on the surface of the matrix until they enter the external magnetic fields.

At this point, an element entering the magnetic field provided by a pair of oppositely poled magnets is, in effect, captured by the magnet pair since the external field favors the low reluctance path provided by the magnetic coating on the element. This low reluctance path associated with an element substantially eliminates the external field at the corresponding magnet pair so that only one element is captured by each pair. In this manner, each element is precisely located on the matrix surface at a point overlying a pair of oppositely poled magnets. In addition, the elements are oriented in a predetermined manner since each external magnetic field causes the corresponding element to be positioned such that its magnetic coating is adjacent the pole faces of the magnets, i.e., the surface of the matrix.

Further features and advantages of the above invention will become more readily apparent from the following detailed description of a specific embodiment when viewed in conjunction with the accompanying drawings, in which.

Figure 1:
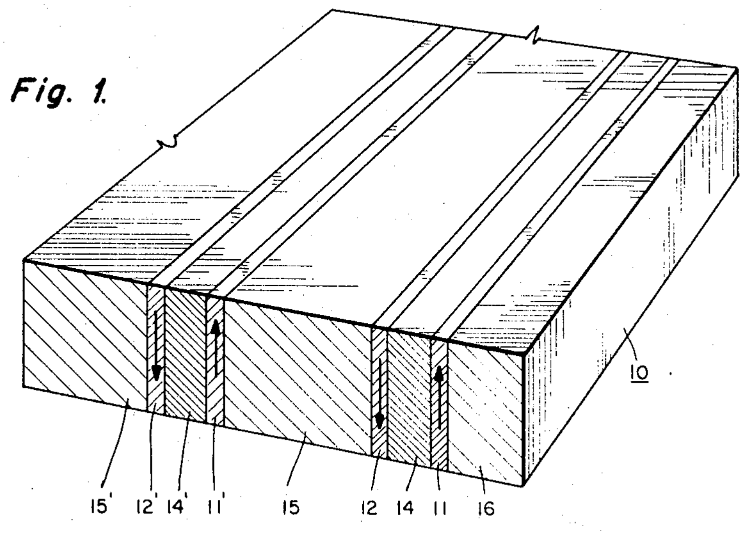
FIG. 1 is a view in perspective of a laminated base employed in fabricating a magnetic matrix.
Figure 2:
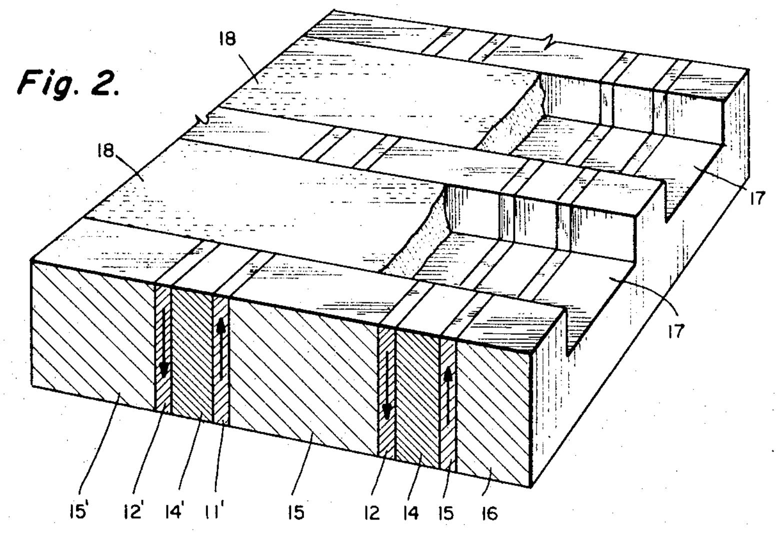
FIG. 2 is a view in perspective showing a partially fabricated matrix.
Figure 3:
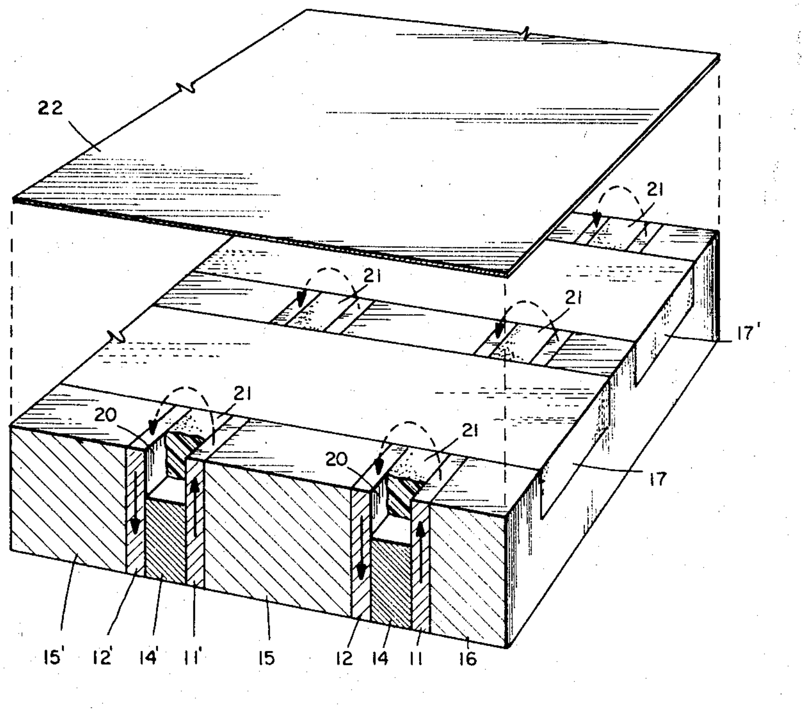
FIG. 3 is a view in perspective showing a fabricated matrix.

In accordance with the present invention, a matrix containing a plurality of spaced oppositely poled magnets is employed to locate and orient the discrete elements. Referring to FIG. 1–3, the fabrication of this matrix is shown as comprising a plurality of steps.

Initially, a laminated base 10 is formed containing a plurality of groups of laminations. Each group contains first and second permanent magnets 11, 12, a magnetic spacer 14 interposed therebetween, and a non-magnetic lamination 15 adjacent the second permanent magnet 12. The permanent magnets 11, 12 are poled in opposite directions as shown by the arrows of FIG. 1 and are formed of a material having a strong coercive force such as platinum-cobalt alloy or the like. The magnetic spacer may be formed of iron and the lamination 15 may be formed of stainless steel. In addition, a non-magnetic lamination 16 may be located adjacent first magnet 11. As shown, the group is repetitive along one direction of the base. The laminations are bonded together by epoxy or the like to form an integral structure.

A plurality of channels 18 are then formed in a large area surface of the laminated base. The channels, which may be formed by conventional machining techniques, are transverse to the laminations so that a matrix comprising a plurality of pairs of oppositely poled magnets are formed. The channels are filled with a hard, non-magnetic filler, for example, a silica-filled resin such as Shell Epon 815 Agent D catalyst with fine silica added. Although a magnetic matrix is formed, substantially no external magnetic field is present at the surface of the matrix since the magnetic spacer 14 between each pair of magnets provides a low reluctance path therebetween.

Next, as shown in FIG. 3, a portion of the spacer 14 adjacent the matrix surface is removed, for example, by controlled etching to form notches 20. In the case of iron spacers, the etchant may be nitric acid. By removing a portion of the iron spacer, an external magnetic field, shown by the dashed lines, is established at each pair of magnets. The spacing of the magnet pairs and the corresponding external fields in the direction transverse to the laminations is determined by the width of the non-magnetic laminations 15. The spacing in the direction parallel to that of the laminations is determined by the width of the channels 17. In practice, this spacing is made substantially larger, for example, ten times, than the spacing between the individual magnets in a pair. As a result, the external magnetic fields are substantially confined to the location of each magnet pair. The notches 20 are filled with a hard non-magnetic material, for example, a resin such as Shell Epon 815, Agent D catalyst, so that a uniform matrix surface is provided. The strength of the individual magnetic fields is determined by the depth of the notches for a given material and a given magnet spacing. The depth of the notches 20 should be uniform throughout the matrix such that the external field at the magnet pairs is constant regardless of the location of the pair in the matrix. In one embodiment wherein the width of each magnet was 0.5 mil and the width of the spacer was 2 mils, the notches were etched to a depth of 2 mils.

Figure 4:
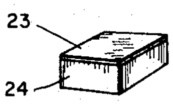
FIG. 4 is a view in perspective of a typical element to be incorporated in an array.

A typical element 24 to be incorporated in the fabricated array is shown in FIG. 4. The element, which may be a diode or a single crystal semiconductor die, is provided with a magnetic coating 23, such as iron having a typical thickness of 0.5 mil, on one surface thereof. Although only one surface of the element is coated, in arrays wherein the orientation of the elements is unimportant additional surfaces may be coated. While the magnetic coating of the surface of the element may be utilized as one electrode thereof, in practice, it has been found desirable to provide a non-magnetic conductive layer 22 having a thickness, for example of 0.1 mil, on the surface of the matrix. This layer provides a continuous bottom electrode for the fabricated array.

A multiplicity of elements is placed on the surface of the matrix without regard to location or orientation. The matrix is then vibrated to impart rotation to the elements which move freely about the matrix surface until each comes under the influence of an external magnetic field. When an element enters the field established by a magnet pair, the effect of the field is to attract the magnetic coated surface of the element toward the pole faces of the magnets. The element is then, in effect, captured by the field and oriented thereby so that its magnetic coating is adjacent the pole faces of the magnets and establishes a low reluctance path therebetween. This low reluctance path removes any external field at this magnet pair and thereby insures that only one element is located at each pair.

Figure 5:
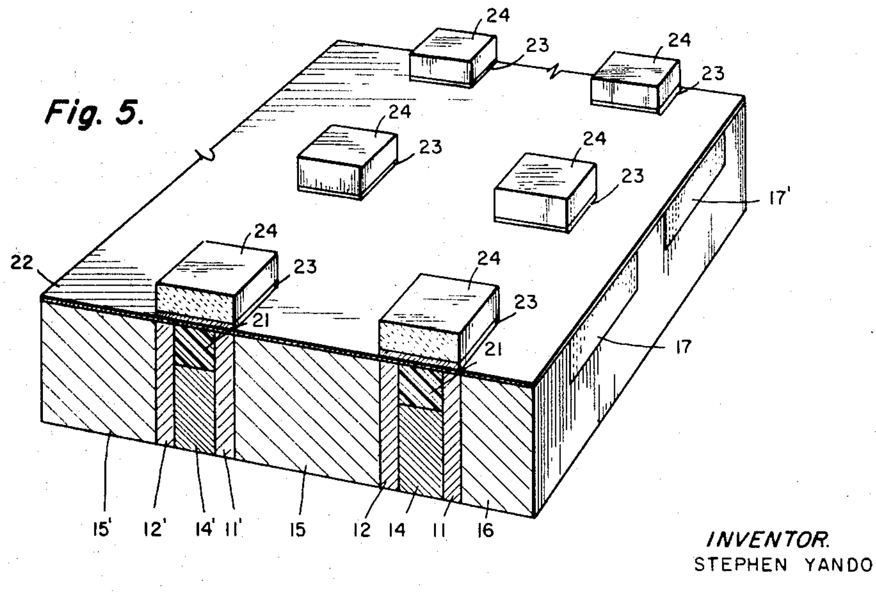
FIG. 5 is a view in perspective of the matrix of FIG. 1 having a plurality of oriented elements located thereon.

The resultant location and orientation of the elements are shown in FIG. 5. It will be noted that the combined width of the notch 20 and the adjacent magnets is substantially equal to the width of the coated surface of the elements. This enables the external field produced by each magnet pair to be eliminated due to the low reluctance path provided by the magnetic coating 23. In practice, the combined width is made somewhat less than the width of the coated surface of the elements to insure that a single element eliminates the corresponding external field. For example, the combined width was selected to be about 3 mils for elements having a width of 4 mils. In addition, the use of a single coating 23 enables the polarity of the positioned elements to be uniform throughout. This is found useful where a number of diodes are to be incorporated in array.

When the elements are oriented and located as shown in FIG. 5 and any excess elements have been removed, a layer of nonconductive bonding agent 25 having a thickness substantially equal to the height of the arrayed elements is placed on the exposed surface of the elements. The layer 25, as shown in FIG. 6, covers the entire matrix surface.

Next, pressure is applied to the exposed surface of the layer 25. The pressure is non-uniformly applied with the points of maximum pressure being in substantial registration with the top surfaces of the elements 24. As a result, the bonding agent is distributed between the elements 24 and the top surfaces of the elements are exposed. In the case of a thermosetting resin layer 25 such as Shell Epon 828, Agent D catalyst, pressure of about 10 p.s.i. is applied prior to the curing of the resin. In this case, the resin was cured by heating to 100° C. for 30 minutes. However layer 25 may be formed of a thermoplastic bonding agent such as polyethylene, in which case heat of about 150° C. is applied concurrently with a pressure of about 10 p.s.i. to enable the layer to yield under pressure.

Figure 6:
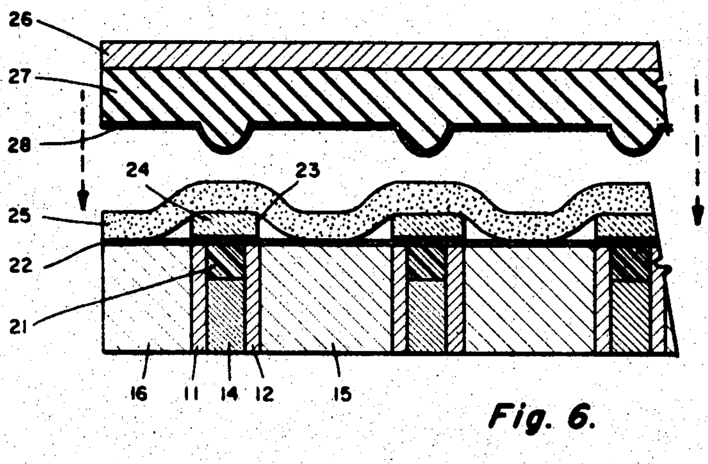
FIG. 6 is a side view of FIG. 4 showing the forming of an array.

The pressure is applied to layer 25, as indicated in FIG. 6, wherein a non-uniform resilient pad 27 is shown affixed to a rigid backing plate 26. The non-uniformities on the lower surface of pad 27 are in substantial registration with the top surfaces of elements 24. In addition, a thin layer of conducting material 28, such as silver foil having a thickness of 0.1 mil, is pressed over and removably adheres to the surface of pad 27. The pad is pressed against the elements on the matrix so that the bonding agent flows between the elements and the silver foil is secured to the top surface of each element. The use of a thermoplastic bonding agent to insure that layers 28 and 22 do not contact each other is preferred since its yielding and resultant flow characteristics may be readily controlled during the application of the pressure.

Figure 7:
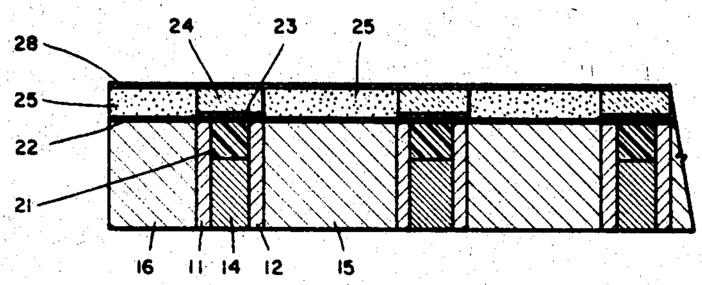
FIG. 7 is a side view of a formed array on the matrix.
Figure 8:
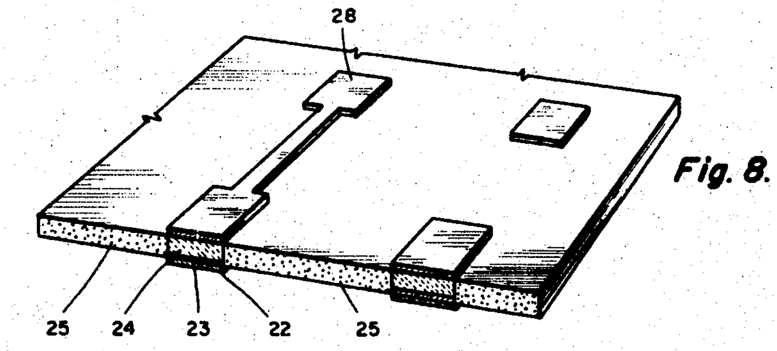
FIG. 8 is a view in perspective of a completed array after removal of the matrix and etching.

The pad 27 is then removed and the resultant structure is shown in FIG. 7 wherein each element is contained in an integral structure by the adjacent bonding material and is provided with top and bottom electrodes comprised of layers 28 and 22 respectively. The matrix is then removed and the top and bottom surfaces of the fabricated array of elements are selectively etched by graphic arts techniques to remove unwanted portions of the conductors. The completed array is shown in FIG. 8 wherein two elements are interconnected by their top electrodes and the remainder are electrically isolated by the etching. Although the conducting layer 28 is described above as being applied by pad 27, it will be noted that the conducting layer may be deposited subsequent to the application of pressure by conventional deposition techniques if desired.

While the above description has referred to a preferred embodiment of the invention, it will be recognized that many modifiactions and variations may be made therein without departing from the spirit and scope of the invention.

What is claimed is:

1. The method of fabricating a planar array of spaced discrete elements, each element having a magnetic coating on at least one surface thereof, comprising the steps of (a) placing a plurality of discrete elements on the surface of a magnetic matrix containing a plurality of pairs of spaced oppositely poled magnets disposed in a non-magnetic base, each of said pairs of magnets establishing an external magnetic field proximate to the surface of said matrix;

(b) vibrating said matrix to impart motion to said elements, the magnetic coating on the surface of the elements being attracted by and establishing a relatively low reluctance path for the individual magnetic fields established by the magnet pairs, each element so attracted being oriented with its coated surface adjacent the surface of the matrix and located in overlying relationship to one of said pairs of magnets, the attracted elements being spaced in accordance with said pairs of magnets;

(c) removing non-attracted elements from the surface of said matrix;

(d) placing an electrically nonconductive bonding agent between said oriented and located elements to thereby form a substantially self sustaining array;

(e) forming an adherent electrically conductive layer on the exposed surface of said elements and bonding agent; and (f) removing said matrix.

2. The method of claim 1 further comprising the step of selectively removing portions of said conducting layer between said oriented elements.

3. The method of claim 2 further comprising the steps of (a) placing a non-magnetic electrically conductive layer on the first surface of said matrix prior to placing said elements on said matrix, and (b) selectively removing portions of said non-magnetic electrically conductive layer between the oriented and spaced elements when said matrix is removed.

4. The method of claim 3 in which the steps of placing an electrically nonconductive bonding agent between elements and forming an adherent electrically conductive layer thereupon comprise the steps of (a) placing a layer of said bonding agent on the exposed surface of said elements, said layer overlying substantially the entire matrix;

(b) placing the electrically conductive layer on said bonding agent layer; and (c) applying an uneven pressure to said conductive layer, said pressure having a maximum at points in substantial registration with said exposed surface of each element, whereby the bonding agent is caused to flow between said elements and the conductive layer is affixed to said exposed surface of each elements.

5. The method of claim 3 in which the steps of placing an electrically nonconductive bonding agent between elements and forming an adherent electrically conductive layer thereupon comprise the steps of (a) placing a layer of thermoplastic material on the exposed surface of said elements, said layer overlying substantially the entire matrix;

(b) placing a conductive layer on said bonding agent layer;

(c) applying heat to said thermoplastic material thereby causing said material to yield;

(d) applying an uneven pressure to said conductive layer, said pressure having a maximum at points in substantial registration with said exposed surface of each element, whereby the bonding agent is caused to flow between said elements and the conductive layer is affixed to said exposed surface of each elements; and (e) terminating the application of heat to said thermoplastic material.

6. The method of fabricating an array of spaced discrete elements, each element having a magnetic coating on at least one surface thereof, comprising the steps of (a) forming a matrix containing a plurality of spaced pairs of spaced oppositely poled magnets disposed in a non-magnetic base, each of said pairs of magnets establishing an external magnetic field proximate to a first surface of said matrix, said pairs of magnets being spaced in accordance with the spacing of the elements in said array;

(b) placing a multiplicity of discrete elements on the first surface of said matrix;

(c) vibrating said matrix to impart motion to said elements, the magnetic coating on the surface of the elements being attracted by and establishing a relatively low reluctance path for the magnetic fields established by the magnet pairs, each element so attracted being oriented with its coated surface adjacent said first surface;

(d) removing the non-attracted elements;

(e) placing an electrically nonconductive bonding agent between said oriented elements thereby forming a substantially self-supporting planar array;

(f) forming an adherent electrically conductive layer on the exposed surface of said elements and said bonding agent;

(g) removing said matrix; and (h) selectively removing portions of said conductive layer between said oriented elements.

7. The method of claim 6 further comprising the steps of (a) placing a non-magnetic electrically conductive layer on the first surface of said matrix; and (b) selectively removing portions of said non-magnetic conductive layer between the oriented and spaced elements when said matrix is removed.

8. The method of claim 7 in which the steps of placing an electrically nonconductive bonding agent between elements and forming an adherent electrically conductive layer thereupon comprise the steps of (a) placing a layer of said bonding agent on the exposed surface of said elements, said layer overlying substantially the entire matrix;

(b) placing the conductive layer on said bonding agent layer; and (c) applying an uneven pressure to said conductive layer, said pressure having a maximum at points in substantial registration with said exposed surface of each element, whereby the bonding agent is caused to flow between said elements and the conductive layer is affixed to said exposed surface of each elements.

9. The method of claim 6 further comprising the step of forming a magnetic coating on at least one surface of each of said discrete elements.

10. The method of claim 9 in which the steps of placing a conductive layer on the bonding agent layer and applying uneven pressure thereto further comprise the steps of (a) removably adhering a layer of electrically conductive foil to the non-uniform surface of a resilient pad, the non-uniformities in said pad being in substantial registration with said elements;

(b) contacting said bonding layer agent with the coated surface of said pad; and (c) applying pressure to said pad so that said bonding agent is placed between said elements, said pressure affixing said foil to the top surfaces of said elements.

References Cited

UNITED STATES PATENTS

| | | | |
|---|---|---|---|
| 2,743,507 | 5/1956 | Kornei | 29—603 |
| 2,848,748 | 8/1958 | Crump. | |
| 3,010,054 | 11/1961 | Goudsmit. | |
| 3,038,139 | 5/1962 | Bonanno | 335—285 X |
| 3,061,919 | 11/1962 | Tack. | |
| 3,117,368 | 4/1964 | Bartik | 29—602 |
| 3,228,133 | 1/1966 | Baermann | 335—285 X |
| 3,297,352 | 1/1967 | Larrison et al. | 335—285 XR |
| 3,336,662 | 8/1967 | Howland et al. | 29—602 |
| 3,216,074 | 11/1965 | Harrison. | |

FOREIGN PATENTS

| | | |
|---|---|---|
| 1,018,139 | 10/1957 | Germany. |

JOHN F. CAMPBELL, *Primary Examiner.*

ROBERT W. CHURCH, *Assistant Examiner.*

U.S. Cl. X.R.

29—203, 529, 577, 590, 602, 603, 604, 627; 174—68.5; 264—9, 24, 272; 269—8; 335—285, 286